June 4, 1935. A. A. TROMBLY 2,003,321
MACHINE FOR ATTACHING KEYS TO CONTAINERS
Filed June 14, 1933 9 Sheets-Sheet 1

Fig.1.

June 4, 1935. A. A. TROMBLY 2,003,321
MACHINE FOR ATTACHING KEYS TO CONTAINERS
Filed June 14, 1933  9 Sheets-Sheet 2

Fig. 2.

June 4, 1935.  A. A. TROMBLY  2,003,321

MACHINE FOR ATTACHING KEYS TO CONTAINERS

Filed June 14, 1933  9 Sheets-Sheet 3

Inventor
Alexander A. Trombly
by Sturtevant, Mason & Porter
Attys.

Patented June 4, 1935

2,003,321

UNITED STATES PATENT OFFICE 2,003,321

MACHINE FOR ATTACHING KEYS TO CONTAINERS

Alexander A. Trombly, Chicago, Ill., assignor to Continental Can Company, Inc., New York, N. Y., a corporation of New York Application June 14, 1933, Serial No. 675,839

13 Claims. (Cl. 113—1)

The invention relates to new and useful improvements in a machine for attaching solder to keys which may be used for removing a tearing strip or for otherwise opening a container.

An object of the invention is to provide a key with a predetermined amount of solder mechanically joined to the key as a unit so that when the key is placed on a container, it may be attached thereto by the applying of heat to the region of the key carrying the solder.

A further object of the invention is to provide a key of the above character wherein the solder is placed in a pocket and the pocket is so constructed that the key may be soldered to the container when placed either side up on the container.

A still further object of the invention is to provide a machine which operates automatically upon the key to form a pocket therethrough of predetermined size and to fill the pocket with solder forced into the pocket so as to be frictionally gripped and retained in the pocket, and with means for severing the surplus solder so that a predetermined quantity of solder will be retained in each key.

These and other objects will in part be obvious and will in part be hereinafter more fully disclosed.

In the drawings which show by way of illustration one embodiment of the invention—

It is very desirable to attach the key which is used to remove the tearing strip of an easy opening container to the container so that it becomes a part of the unit and is marketed with the container. Various ways have been provided for attaching keys to containers of this type and for soldering the key to the container. The present invention has to do with the preparation of the key for solder bonding the key to the container. It is desirable that the key shall have a predetermined amount of solder applied thereto and in such a way that when heat is applied for solder bonding the key to the container, the solder bond will be properly placed for uniting the key to the container with a minimum amount of solder. To this end, the machine is provided with means for forming an opening through the key. This provides a pocket of predetermined dimensions. A solder wire is cut into proper lengths so as to supply sufficient solder to fill the pocket, and this solder section is forced into the pocket in such a way that it becomes mechanically joined to the key, and is frictionally held in the pocket. In order that a predetermined amount of solder may be used, and only sufficient solder to effect a proper solder bond, the surplus solder projecting from the pocket is removed by severing the same.

Figure 18:
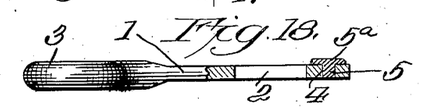
Fig. 18 is a vertical sectional view through a key showing the solder forced into the pocket and frictionally held therein prior to the trimming off of the surplus solder.
Figure 19:
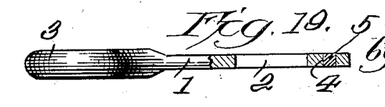
Fig. 19 is a view similar to Fig. 18, but showing the surplus solder removed and the key in its finished form for attachment to the container.

It is thought the invention will be better understood by a detail description of the machine and the mechanism contained therein for accomplishing the result desired. In Figures 18 and 19 of the drawings, there is shown one form of key for removing a tearing strip from an easy opening container. The key includes a shank portion 1 having a slot 2 therethrough which is placed over a projecting tongue at the tearing strip. The key is also provided with a handle 3 whereby it may be easily grasped and rotated for winding the tearing strip on to the shank of the key. The key, as shown in the drawings, is provided with an extension at the slot end thereof, and this portion of the key is subjected to a punch for punching an opening through the key indicated at 4 in the drawings. A solder lump, preferably in the form of a section of solder wire, is placed over this opening and is forced into the opening by a punch so as to provide a slug of solder indicated at 5 in the drawings. When the solder is forced into the opening with the key resting on the anvil, there will be a surplus amount of solder indicated at 5a, and this is severed so as to leave just sufficient solder to fill the pocket. The key is thus completed ready for attachment to a container end. It carries just the right amount of solder for solder bonding the key to the end. The key may be placed on the container end, either side up, and when heat is applied to the region carrying the solder slug, it will be melted, and the solder will run beneath the key, and between the key and the container end, thus firmly bonding the key to the container end.

Figure 1:
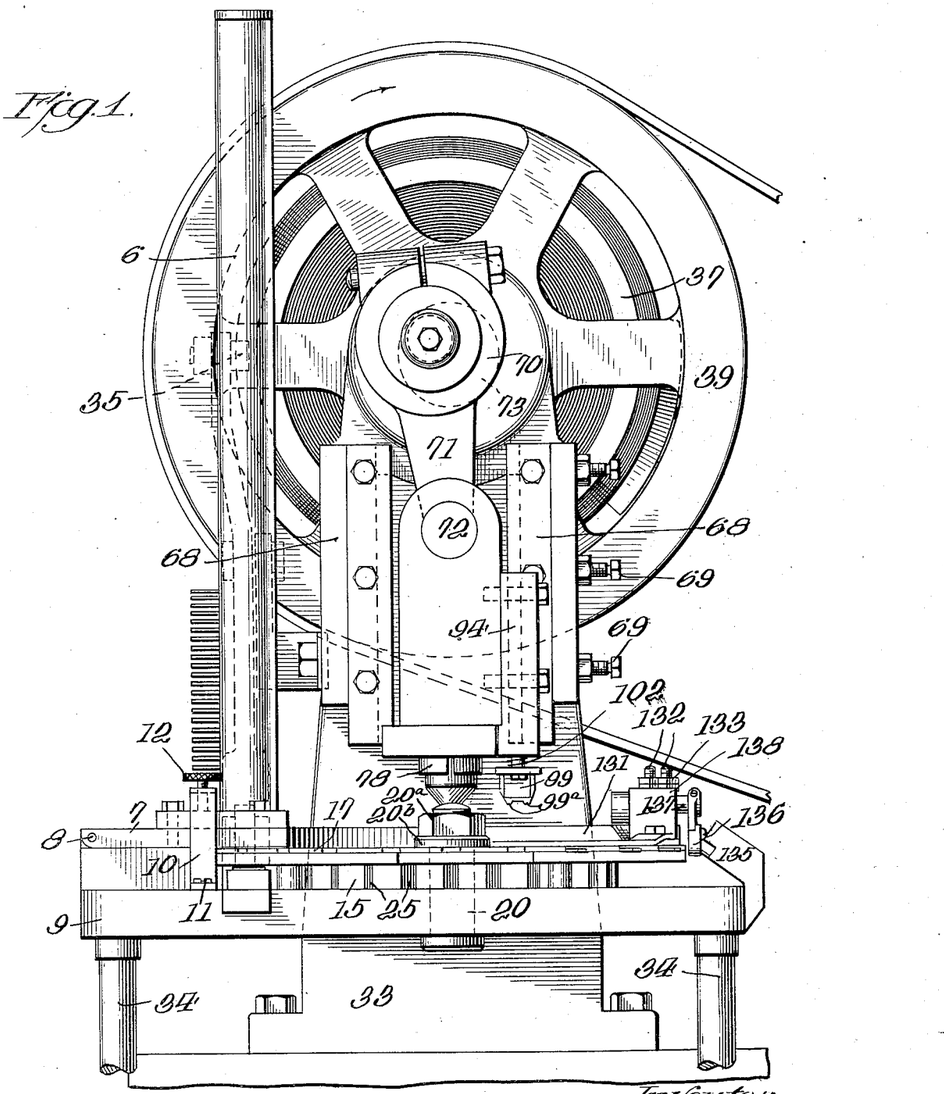
Figure 1 is an end view of a machine embodying the improvements.
Figure 3:
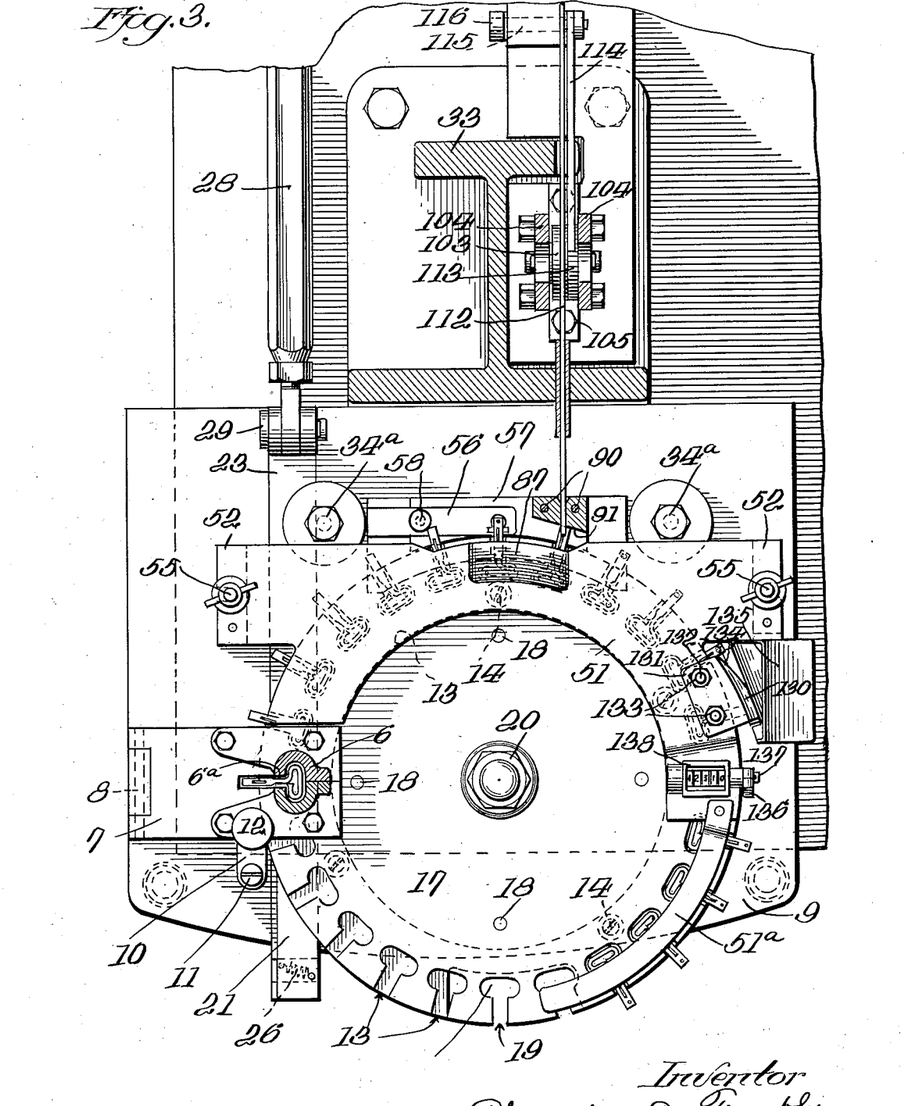
Fig. 3 is a horizontal sectional view through the machine just above the turret and on the line of the solder feed.
Figure 4:
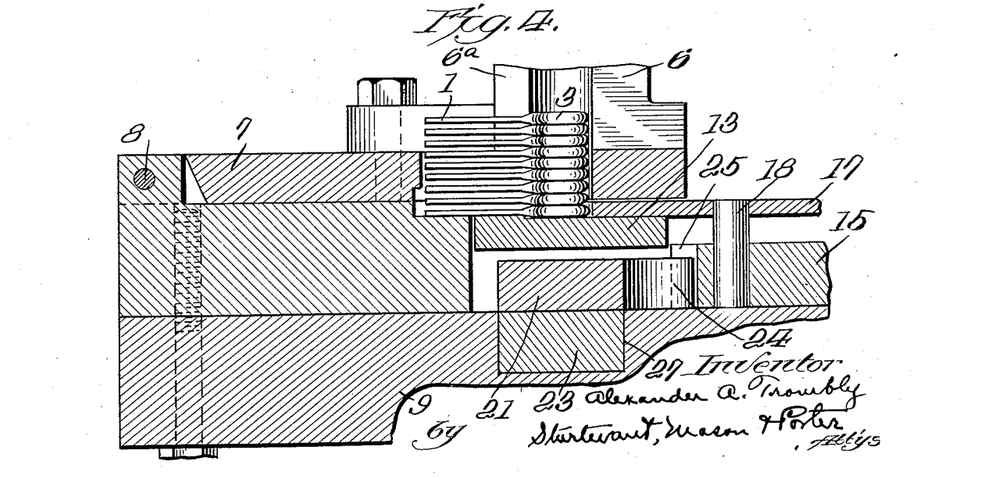
Fig. 4 is a vertical sectional view through the lower end of the key magazine showing the manner of feeding the keys into the pockets in the supporting turret for the keys.

As has already been noted, the invention is directed particularly to the machine for applying this predetermined amount of solder to the key and mechanically joining the same into a unit. The keys with the handle formed thereon and the slot therethrough are stacked one on another in a magazine 6. This magazine 6 is so shaped as to receive the handle end of the key, and there is a slot 6a through the side of the magazine through which the shank of the key extends. The magazine is bolted to a supporting base plate 7 and this base plate is hinged at 8 to the table 9 of the machine. There is a bracket 10 pivoted at 11 which can be swung over the base plate, and said bracket carries a screw 12 used for clamping the base plate so as to support the magazine in its upright position as shown in Fig. 1 of the drawings. The purpose of pivotally supporting the magazine so that it may be released and tilted is to give access to a turret beneath the same for removing any key which may be bent and jammed. In tilting the hopper, the operator grips the lower keys with his fingers and thus prevents the keys from dropping out. Located beneath the magazine and attached to the table is an annular plate 13. Attached to the table are a series of supporting posts 14, and this supporting plate 13 rests on top of these posts, so that it is spaced away from the table. Screws pass through the plate into a post and rigidly hold the plate in a fixed position. Mounted for rotation on the table is a disk 15. Said disk is provided with a hub 16 on its upper face, and resting on said hub is a turret 17 which receives the keys from the magazine and presents them to the various devices which operate thereon. This turret is provided with openings which slip down over pins 18, 18, and this joins the turret to the disk 15 so that it is intermittently rotated therewith. The turret and disk are pivotally supported on the table 9 by a bolt 20. Threaded on to the end of the bolt is a nut 20a and beneath the nut 20a is a washer 20b which overlies the turret. The turret overlies the supporting plate 13 and passes beneath the magazine. The turret is provided with pockets 19. Each pocket is shaped so as to conform to the handle of the key, and is also slotted radially so that the shank of the key will project beyond the peripheral edge of the turret as clearly shown in Fig. 3 of the drawings. These pockets conform sufficiently closely to the shaping of the key as to slide the keys along the supporting plate 13 and position the keys for operation thereon by the several devices which will be hereinafter described.

Figure 5:
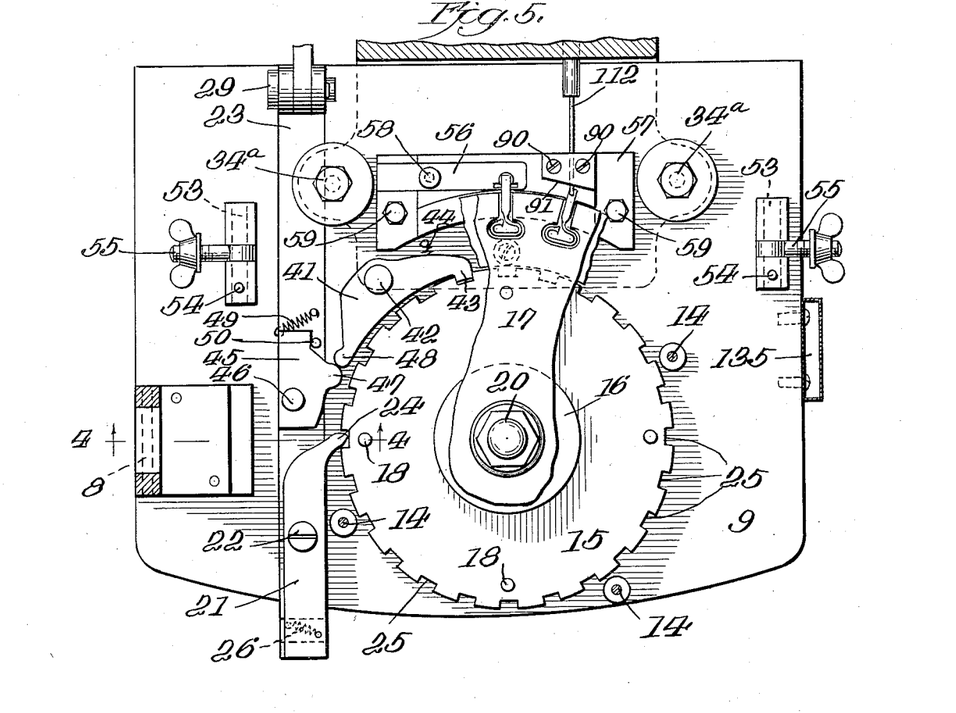
Fig. 5 is a view partly in section and partly in plan and with parts of the turret broken away to show the means for intermittently rotating the turret.

The disk 15 is intermittently rotated, thus imparting intermittent rotation to the turret by means of a pawl 21 which is pivoted at 22 to a bar 23. This pawl has an offset tooth 24 which is adapted to engage one of the recesses 25 in the peripheral edge of the disk 15. A spring 26 normally urges the pawl into engagement with the disk and causes the tooth to engage a recess and at the same time allows the pawl to yield in its retrograde movement so as to slip out of one recess and engage another. The bar 23 slides in a recess 27 formed in the table 9. Said bar is moved endwise in one direction by a link 28 which is pivoted at 29 to an upstanding lug carried by the bar. The other end of the link 28 is pivoted at 30 to a lever 31. This lever 31 is pivotally supported by a bracket 32 bolted to a standard 33 carried by the main frame of the machine, and the table 9 is in part supported on this standard and in part supported on leg members 34. It is bolted to the standard by holding bolts 34a. At the upper end of the lever 31 is a roller 35 carried by a stud 36 and this roller 35 runs on a face cam 37 carried by a disk 38 mounted on the main actuating shaft. The main actuating shaft is driven by a belt wheel 39 and this main actuating shaft is mounted for rotation in bearings carried by the standard 33. As the shaft rotates, this face cam will cause the lever to be oscillated, and when the link 28 is moved to the left, it will slide the bar 23 to the left, and this will cause the pawl 21 to move the disk 15 supporting the turret one step in a clockwise direction. When the lever is swung in the opposite direction, then the pawl is retracted and will slip into another recess for giving another step movement to the turret on the next rotation of the actuating shaft. A spring 40 is attached to the table 9 at one end and to the link 28 at the other end. This spring holds the roller in contact with the face cam, and is the active means for moving the bar 23 to the right, as viewed in Fig. 6, for retracting the pawl and placing the same in another recess.

Figures 6, 11:
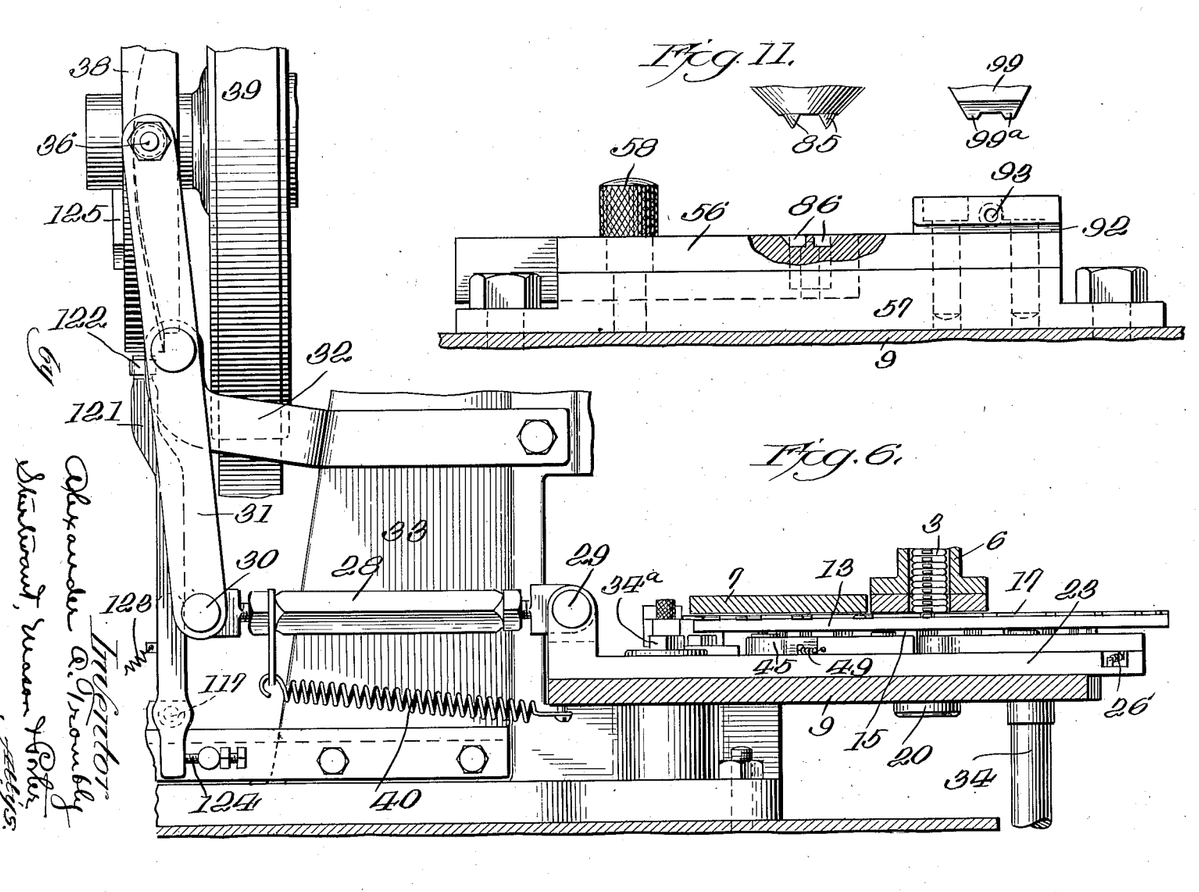
Fig. 6 is a vertical sectional view through a portion of the machine showing the turret feed, the magazine and the means for intermittently rotating the turret.
Fig. 11 is a view showing more or less diagrammatically the anvil on which the key is supported while it is being punched, the holder for the key, and the cutting devices for cutting the solder wire into the proper length for insertion in the pocket and key.

The turret is held from retrograde movement when the pawl is retracted by a retaining dog 41. Said retaining dog is pivoted at 42 and is provided with a tooth 43 adapted to engage one of the recesses in the disk 15. The tooth is so shaped that when it is moved into one of the recesses, it will position said disk 15 and hold it in a set position. A compression spring 44 operating on the dog forces it into one of the recesses. A member 45 is pivoted at 46 to the bar 23. This member carries a cam 47 which operates on the tail end 48 of the holding dog. There is a spring 49 which turns the member 45 so as to hold it against a stop pin 50, and this positions the cam 47 so that it contacts with the dog when the bar is moved for shifting the disk 15 and will force the dog out of the recess, thus releasing the disk so that it can be turned. The cam 47 serves to hold the dog out during the feeding movement of the pawl.

From the above it will be apparent that the turret is fed step by step beneath the magazine and will receive keys from the magazine which will be placed in succession in the pockets. The keys thus loaded on the turret are conveyed beneath the hold-down plate 51. This hold-down plate 51 is semi-angular in shape and is provided with extensions 52, 52. The extensions 52 rest on supporting blocks 53, 53, and are held from shifting thereon by pins 54. Swinging clamping bolts 55 are moved into recesses in the ends of the extensions, and thus the hold-down plate is detachably secured to the table 9 of the machine. The key is first presented to a punch for punching the hole 4 in the end thereof. The end of the key projecting from the periphery of the turret is carried over an anvil 56. This anvil 56 engages in a recess in a supporting member 57 and is held therein by a knurled clamping bolt 58. The supporting member 57 is in turn secured to the table 9 by clamping plates 59, 59. The supporting member 57 is cut away as indicated at 57a (Fig. 12), and the turret moves over this portion 57a and carries the key on to and across the upper face of the anvil 56. The anvil carries a die 60 with which a punch 61 cooperates. The die 60 may be replaced by removing the anvil whenever it is necessary, and there is an opening 62 leading down through the anvil and the table beneath the same through which the part punched out of the key is discharged. The punch 61 is provided with a supporting shank 63 which fits in a recess in a punch supporting member 64. The punch is secured in this recess by a holding bolt 65. The punch supporting member 64 is carried by a cross head 66. This cross head 66 is provided with supporting members 67, 67 at the sides thereof, which slide in guideways carried by the standard 33. There are suitable wear plates for the cross head, and this cross head is held on the guideways by plates 68, 68 which are bolted to the front of the standard. Screws 69 are provided for taking up the wear. The cross head is reciprocated in the guideways by means of an eccentric strap 70 carrying an eccentric rod 71 which is pivoted at 72 to the cross head. This eccentric strap 70 cooperates with an eccentric 73 carried by the main actuating shaft. The supporting member 64 for the punch fits into a recess in the cross head, and is held therein by a locking bolt 74.

Figures 7, 8, 9, 10:
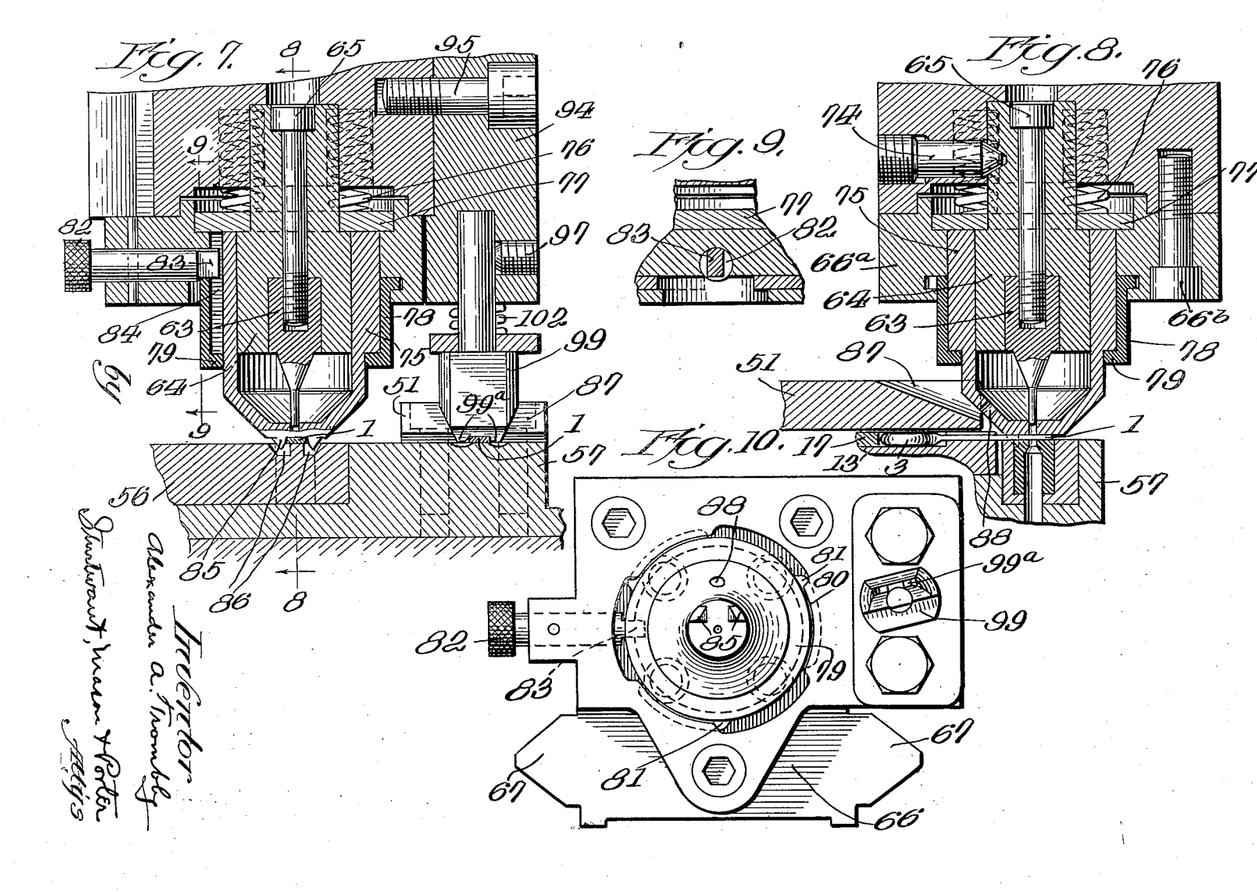
Fig. 7 is a vertical sectional view through the punching head which forms a pocket in the key, said section being taken in a plane at right angles to the radius of the turret which supports and feeds the keys.
Fig. 8 is a vertical sectional view on the line 8—8 of Fig. 7.
Fig. 9 is a sectional view on the line 9—9 of Fig. 7.
Fig. 10 is a bottom plan view of the punching head; also showing the holder and cutter for holding the key and severing the solder wire.
Figures 12, 13, 14:
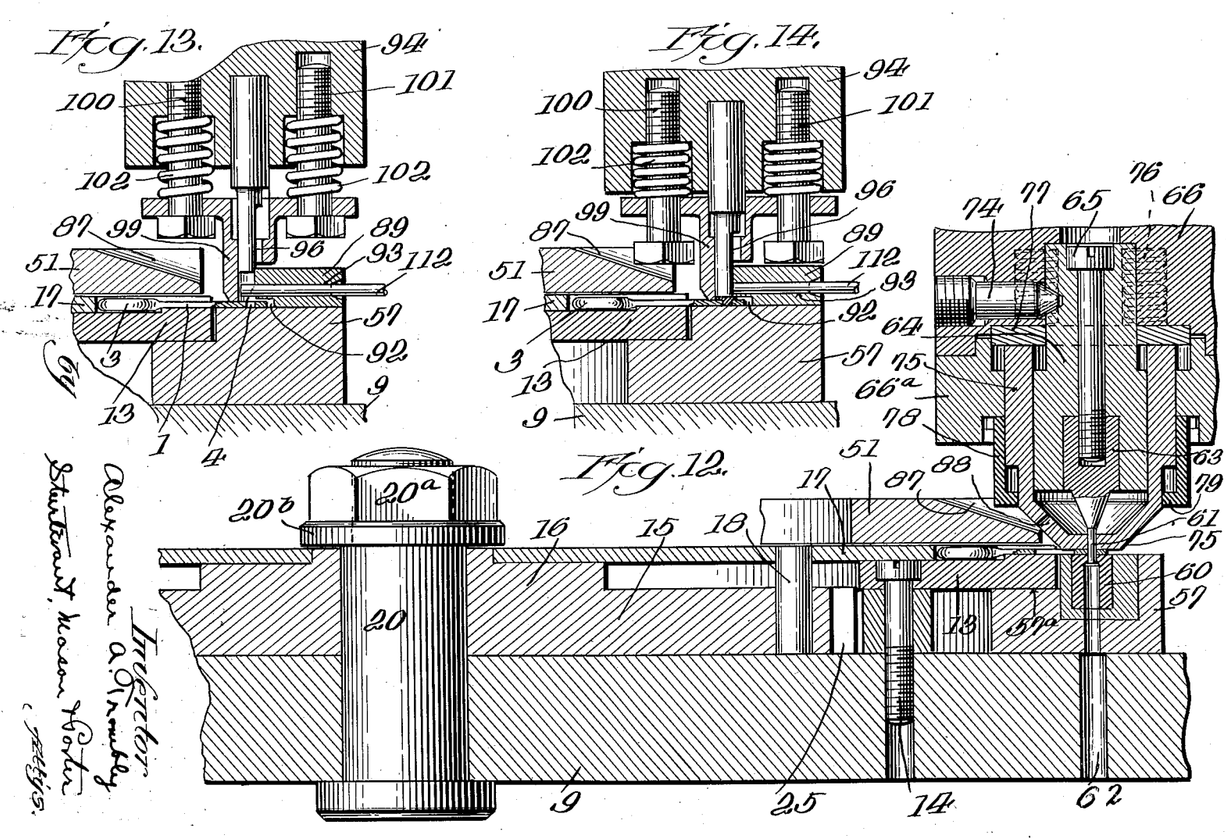
Fig. 12 is a vertical sectional view radially of the turret, similar to Fig. 8, and showing the the punch as having completed its downward movement and formed an opening or pocket through the key.
Fig. 13 is a vertical sectional view through the solder feed showing the key placed beneath the solder wire and the cutter for cutting a solder length in its raised position.
Fig. 14 is a view similar to Fig. 13, but showing the cutter as having severed the solder and as having forced the solder into the pocket filling the same.

In order to hold the key firmly against the anvil during the punching thereof, a presser member 75 is provided. This presser member is in the form of a sleeve surrounding the member 64 for the punch, and the lower end of the sleeve is closed by a conically-shaped portion terminating in a foot which engages the key and presses the same against the anvil. This presser member 75 is yieldingly pressed downward in the cross head by a spring 76 which bears against a plate 77 resting on the upper end of the presser member 75. There is a recess in the cross head which permits the presser member to move relative to the cross head. When the cross head moves down, the presser member will first contact with the key as shown in Fig. 8, and will firmly clamp the same against the anvil. Further downward movement of the cross head will compress the spring 76 and will carry the punch down into contact with the key and force it through the key as shown in Fig. 12. This presser member not only holds the key firmly pressed against the anvil, but strips the key from the punch on the upward movement of the cross head, as the punch will be first withdrawn before the presser member is raised. The downward movement of the presser member relative to the cross head is limited by a stop sleeve 78 which is connected to the cross head and is provided with a flange 79 underlying a shoulder on the presser member. This stop sleeve 78 is secured to the cross head through a bayonet joint connection, as shown in Fig. 10. The cross head has spaced lug 80, and the stop sleeve has an interrupted flange providing ribs 81 which pass between the lugs and are turned so as to overlie the lugs and this holds the stop sleeve in position. In order to prevent the presser member 75 from turning, a pin 82 having a lug 83 on the inner end thereof, extends into a vertical slot 84 formed in said presser member. The presser member is provided with two spaced centering pins 85, 85. When the cross head moves downward, these pins will straddle the shank of the key, and as they are inclined on their inner faces, they will shift the shank of the key so as to center it on the anvil directly beneath the punch. The anvil is provided with recesses 86, 86 which receive these pins 85, 85, respectively, so that they may pass down on each side of the shank of the key. The hold-down plate 52 has a tapered cutaway portion 87 so as to give proper clearance space for the operation of the presser member 75. There is an opening 88 leading through one of the tapered walls of the presser member so as to prevent air being trapped in the sleeve forming the presser member. This insures a free movement of the presser member on the punch supporting member, and also enables the presser member to be provided with a guideway for the punch. The cross head is made in two sections, and the lower section indicated at 66a is bolted to the upper section by bolts 66b. By removing this lower section 66a, the punch supporting member is rendered accessible for removing and changing the punch.

After the key has been punched, it is then presented to the next station where the solder slug is to be inserted in the pocket formed in the key by the punch. The supporting member 57 extends to the solder slug inserting station and supports the key while the slug of solder is being forced into the pocket or opening through the key formed by the punch. Attached to the supporting member 57 is a guide block 89. Said guide block is secured to the support by screws 90, 90 (see Fig. 5). The face 91 of the guide block is substantially tangential to the turret and it is spaced away therefrom. There is a recess 92 at the lower part of the block so that the end of the key passes under this overhanging portion of the guide block. This brings the opening punched through the key substantially in alinement with the face 91 of the guide block. There is an opening 93 through the guide block through which the solder wire is directed. The solder wire is fed forward intermittently so as to project the end thereof beyond the face 91 of the guide block and over the key. The guide block performs the double function of a guide for the solder rod and a shearing blade for cutting off a slug from the end of the solder rod.

Mounted on the cross head and movable up and down therewith is a supporting member 94 which is bolted to the cross head by bolts 95. Fixed to this supporting member 94 is a cutter 96. Said cutter is secured in the supporting member 94 by a set screw 97. The cutter is provided with a face 98 which moves down along the face 91 in contact therewith, and the lower edge of this cutter shears off the solder rod, cutting a slug of solder therefrom. This cutter 96 also performs the function of a punch, as clearly shown in Figures 13 and 14. The solder slug which is cut from the rod is forced by the punch down into the opening or pocket in the key. The extent of movement of the slug through the opening is limited by the supporting anvil 56 so that the solder on the under side of the key is flush with the lower face of the key. The slug is so dimensioned that the pocket is filled full of solder and any surplus solder will be expanded into a head as clearly shown in Fig. 14. Associated with this combined punch and cutter is a presser member 99. This presser member 99 is mounted for vertical movement on two bolts 100 and 101 which are threaded into the supporting member 94. A spring 102 on each bolt bears against the presser member and forces the same downwardly. The presser member will contact with the key on the downward movement of the cross head and the springs will yieldingly hold said presser member against the key and clamp the key against the support. The heads of the bolts limit the movement of the presser member relative to the cross head, and will lift the same from the key when the cross head is raised. The presser member is provided on its lower face with two guides 99a, 99a which are spaced from each other the width of the key. The inner faces are inclined toward the key, and these guides serve to position the key with accuracy beneath the cutter and punch so that the slug will be centered over the pocket or hold through the key and forced into the same by the punch. The anvil is provided with recesses directly beneath the guides 99a, respectively.

Figure 2:
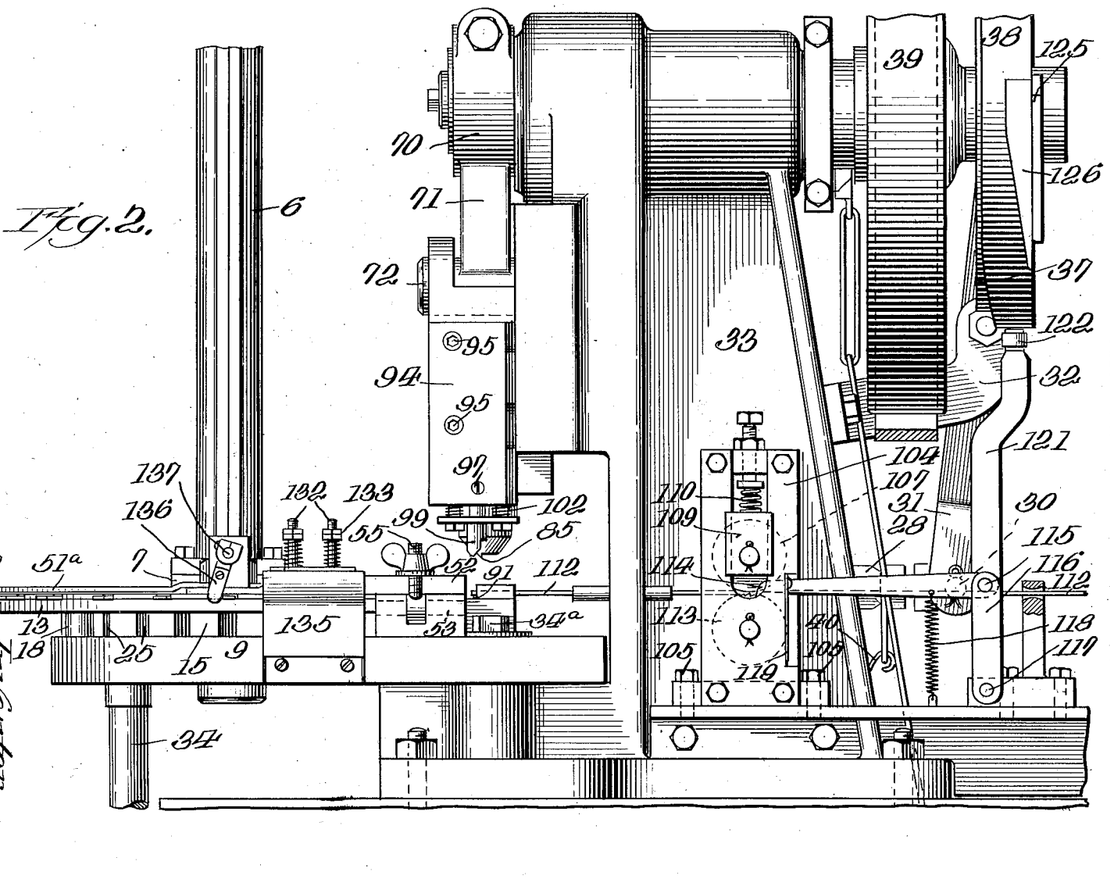
Fig. 2 is a side view thereof.
Figure 20:
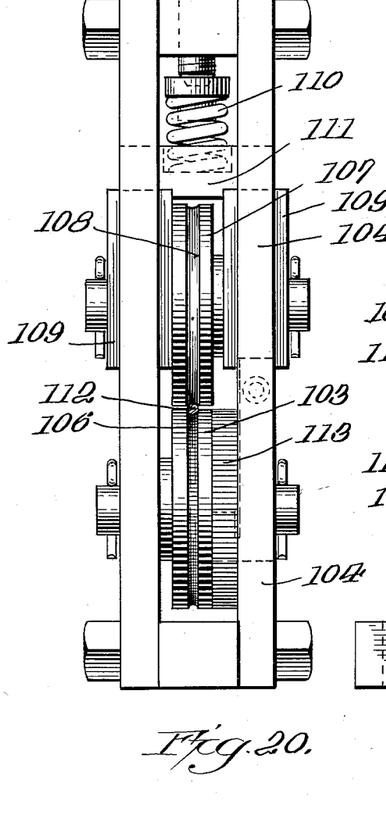
Fig. 20 is an end view of the means for feeding the solder rod.
Figure 21:
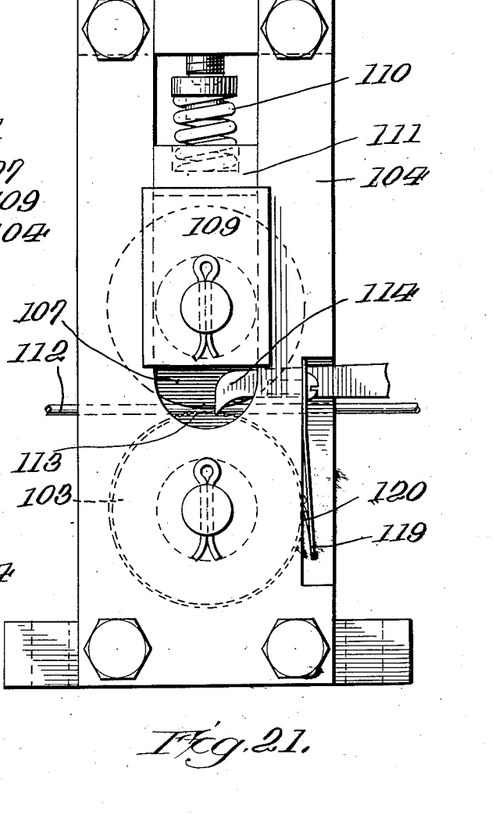
Fig. 21 is a side view of the same.

The solder rod is fed forward when the cross head is raised. The solder rod is fed by the mechanism shown in Figures 20 and 21. A feed roll 103 is journaled in a frame 104 secured to the frame of the machine by suitable bolts 105 (see Fig. 2). This feed roll is provided with a peripheral groove 106. Located directly above the feed roll 103 is a cooperating roll 107 which is also provided with a peripheral groove 108. The feed roll 107 is mounted in bearing blocks 109, 109 which are slidingly supported by the frame. A spring 110 bearing on a cross head 111 which engages the upper ends of the bearing blocks 109 yieldingly forces the upper feed roll downward and into contact with the solder rod which is indicated at 112. The lower feed roll 103 is intermittently rotated by means of a pawl and ratchet mechanism. The ratchet is indicated at 113 and is secured to the feed roll and turns the same. The pawl is indicated at 114. This pawl is pivoted at 115 at an arm 116 which is carried by a shaft 117. A spring 118 connected to the pawl and to the frame yieldingly holds the pawl in contact with the ratchet. When the arm 116 is oscillated so as to move the pawl forward, it will feed the solder rod a sufficient distance to form a solder slug to be inserted in a key, and when the arm is oscillated in the opposite direction, the pawl will move over the ratchet and make new contact therewith for the next feeding movement. Retrograde movements of the feed rolls is prevented by the leaf spring 119 which is secured to the frame and carries a dog 120 engaging the ratchet. The shaft 117 carries an arm 121 which is provided with a roll 122 at the upper end thereof (see Fig. 2). A spring 123 normally turns the shaft 117 in a counter-clockwise direction, holding the lower end of the arm 121 against an adjustable stop 124. There is a plate 125 attached to the disk 38. This plate carries a cam block 126. The cam block engages the roll 122 as the disk rotates, and this will turn the shaft in a counter-clockwise direction, as viewed in Fig. 2, and impart the feeding movement to the pawl 114. The spring 123 turns the shaft in the opposite direction and retracts the pawl. The extent to which the pawl is retracted is determined by the adjustable stop 124. By adjusting this stop, the extent to which the solder rod is projected through the opening in the guide block 89 may be varied, and this will vary the size of the solder slug which is to be forced into the pocket in the key.

Figure 15:
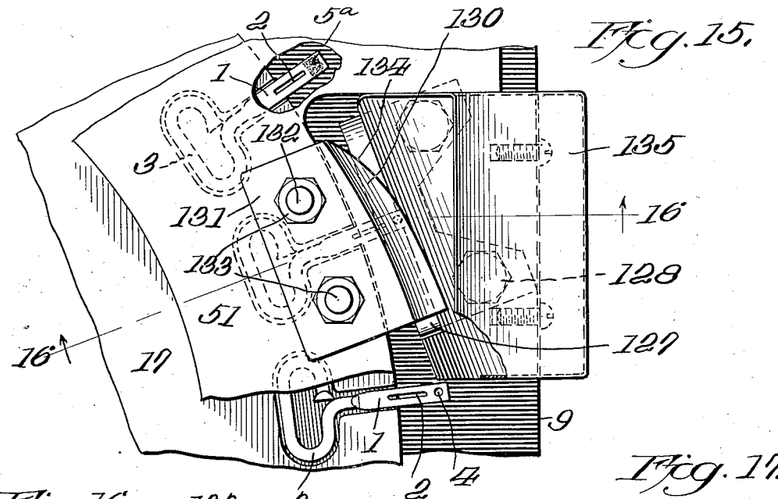
Fig. 15 is a plan view of the severing means for cutting off surplus solder.
Figure 16:
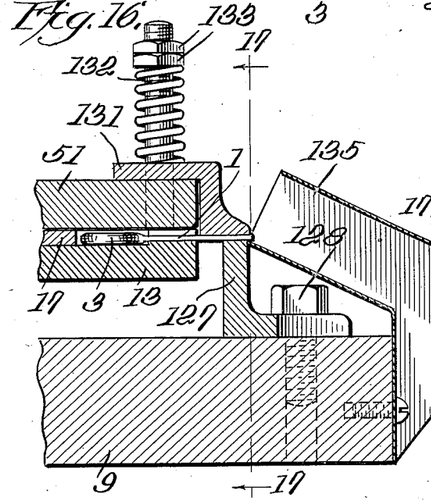
Fig. 16 is a sectional view on the line 16—16 of Fig. 15.
Figure 17:
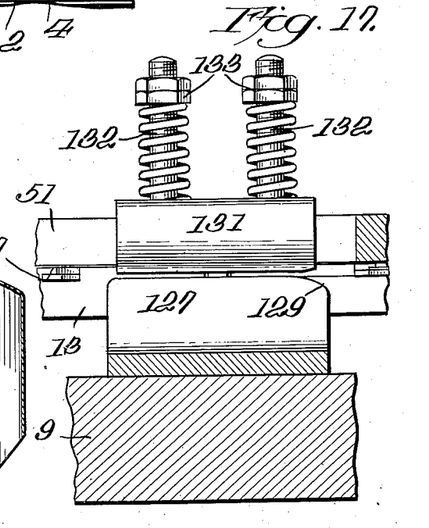
Fig. 17 is a sectional view on the line 17—17 of Fig. 16.

The key with the solder slug attached is next presented to a shearing means which shears off the surplus solder, leaving a predetermined amount of solder attached to the key. The turret carries the key off from the support 57 and positions it on a supporting plate 127 which is secured to the table 9 by suitable bolts 128 (see Figures 15 to 17). The receiving end of the supporting plate 127 is rounded off as indicated at 129 (Fig. 17), and this enables the end of the key to move up on to and across the support. Mounted on the hold-down plate 51 is a shearing blade 130. Said shearing blade is carried by a shank portion 131 which is mounted on two bolts 132, 132 carried by the hold-down plate. These springs engage nuts 133 on the bolts and yieldingly force the shank of the cutter into contact with the hold-down plate. The shearing cutter is provided with a curved cutting knife edge 134. As the key moves along the support 127, this knife edge will sever the solder slug close to the upper face of the key, thus removing the surplus solder, and leaving in the key a solder slug which is of the same dimensions as the opening 4 in the key (see Fig. 19). There is a chute 135 adjacent the supporting plate 127, and the surplus solder as it is removed, is forced into the chute and guided thereby away from the turret where it may be collected.

After leaving the shearing device, the key contacts with an arm 136 carried by a shaft 137 of a counter 138. This arm will be oscillated by the keys in succession, and the number of keys which have been provided with solder are registered. The hold-down plate 51 terminates just beyond the counter, and there is a yielding presser bar 51a carried thereby and overlying the turret which will contact with the top of the turret or the keys in the pockets in the turret. The annular plate 13 is cut away as indicated at 13a, and when the key is moved by the turret over this cut away space, it will be discharged from the turret.

It is thought that the operation of the machine will be obvious from the statements which have been made in connection with the detail description. The keys are taken automatically from a stack holder one at a time by an intermittently rotated carrying turret. The key is first presented to a punch where it is centered beneath the punch and an opening is formed through a key, thus forming a pocket of predetermined size. The key is then presented to the solder applying device, and a slug of solder is cut from the solder rod of the desired dimensions, and it is forced by a punch associated with the cutter into the opening, completely filling the opening with solder, so that it is flush on the lower side, and the surplus solder formed into a head on the upper side of the key. The key is then presented to the shearing station which shears off the surplus solder, leaving only an opening through the key or pocket filled with the solder, and thus a predetermined amount of solder is placed in the key. This solder slug is forced into the pocket, and inasmuch as a sulplus quantity is used, it will make a very tight frictional contact with the walls of the opening before it will spread out to form the head. This mechanically bonds the solder slug to the key so that it may be handled as a unit, without the solder slug dropping from the recess or pocket in the key. When the key is placed on the container end, all that is necessary is to apply heat and the solder will melt and flow from the pocket in the key beneath the same and solder bond the key to the container end. When a predetermined amount of solder is used, a solder bond of uniform size is obtained, and this may be so determined as to bring about a proper union of the key to the container, which will permanently hold the key and container end in assembled relation, and at the same time, permit the solder bond to be broken, if desired, by the proper strain applied to the key. When a predetermined quantity of solder is used, and of a minimum amount necessary to accomplish the solder bonding, the solder bond is practically confined within the limits of the key and is covered thereby. This makes a very neat attaching means for securing the key to the container end.

While the machine is described as applying solder to a key used for removing a tearing strip from a container, it will be understood that it may be used in connection with any type of can opening tool for the purpose of attaching the tool to the container so that it will be marketed with the container, and therefore, the term "key" as used here throughout the description is used in the broad sense, and is not limited to a key having a slot which is attached to a tearing strip. It is also obvious that many changes may be made in the details of construction and the arrangement of parts without departing from the spirit of the invention as set forth in the appended claims.

Having thus described the invention, what I claim as new and desire to secure by Letters-Patent, is—

1. A machine for attaching solder to keys comprising means for forming a pocket in the key, means for forcing solder into said pocket in sufficient quantity to fill the pocket, and cause the solder therein to be frictionally held in the pocket, means for severing the surplus solder projecting from the pocket, and an intermittently rotated turret for supporting the keys and for presenting the same in succession to the pocket forming means, the solder applying means and the severing means.

2. A machine for attaching solder to keys comprising means for forming a pocket in the key, means for forcing solder into said pocket in sufficient quantity to fill the pocket and cause the solder therein to be frictionally held in the pocket, means for severing the surplus solder projecting from the pocket, a magazine for supporting a stack of keys, and a turret having pockets therein for receiving one key at a time with the end thereof projecting beyond the turret, and means for intermittently rotating the turret for presenting the keys in succession to the pocket forming means, the solder applying means and the severing means.

3. A machine for attaching solder to keys comprising means for forming a pocket in the key, means for forcing solder into said pocket in sufficient quantity to fill the pocket and cause the solder therein to be frictionally held in the pocket, means for severing the surplus solder projecting from the pocket, a magazine for supporting a stack of keys, a turret mounted for rotation beneath said magazine and having a series of pockets adapted to receive and support a key with the end thereof projecting from the turret, and means for intermittently rotating the turret for presenting the keys in succession to the pocket forming means, the solder applying means and the severing means, said turret rotating means including a disk attached to the turret and having recesses in the periphery thereof, a reciprocating feed pawl adapted to yieldingly engage in the recess for moving the turret, and a holding pawl adapted to engage one of the recesses for positioning the turret when it stops and for preventing retrograde movement of the turret when the feed pawl is retracted.

4. A machine for attaching solder to keys comprising a support, a turret mounted for intermittent rotation adjacent the support and having means for carrying keys having solder receiving pockets with the ends thereof projecting from the turret so that they may be placed over said support, means for providing and placing a solder slug directly over the opening in the key, and a punch for forcing the slug into said pocket for filling the pocket and mechanically joining the solder slug to the key.

5. A machine for attaching solder to keys comprising a support, a turret mounted for intermittent rotation adjacent the support and having means for carrying keys having solder receiving pockets with the ends thereof projecting from the turret so that they may be placed over said support, means for providing and placing a solder slug directly over the opening in the key, a punch for forcing the slug into said pocket for filling the pocket and mechanically joining the solder slug to the key, and means for severing the surplus solder from the solder slug so as to leave in said pocket a predetermined quantity of solder.

6. A machine for attaching solder to keys comprising a support, a turret mounted for intermittent rotation adjacent the support and having means for carrying keys having solder receiving pockets with the ends thereof projecting from the turret so that they may be placed over said support, a guide block for guiding the solder rod over the pocket in the key, means for severing the solder rod projecting from the guide block so as to provide a solder slug, and a punch for forcing the solder slug into the pocket in the key for mechanically joining the solder slug to the key.

7. A machine for attaching solder to keys comprising a support, a turret mounted for intermittent rotation adjacent the support and having means for carrying keys having solder receiving pockets with the ends thereof projecting from the turret so that they may be placed over said support, a guide block for guiding the solder rod over the pocket in the key, means for severing the solder rod projecting from the guide block so as to provide a solder slug, a punch for forcing the solder slug into the pocket in the key for mechanically joining the solder slug to the key, and means for severing the surplus solder projecting from the key so as to leave a predetermined quantity of solder in the key.

8. A machine for attaching solder to keys comprising a support, a turret mounted for intermittent rotation adjacent the support and having means for carrying keys having solder receiving pockets with the ends thereof projecting from the turret so that they may be placed over said support, a guide block for guiding a solder rod over the pocket in the key, means for clamping the key against the support beneath the solder rod so that the end of the rod projects over the pocket, means for severing the solder rods to form a slug, and a punch for forcing the slug into the pocket in the key for mechanically joining the solder slug to the key.

9. A machine for attaching solder to keys comprising a support, a turret mounted for intermittent rotation adjacent the support and having means for carrying keys having solder receiving pockets with the ends thereof projecting from the turret so that they may be placed over said support, a guide block for guiding a solder rod over the pocket in the key, means for clamping the key against the support beneath the solder rod so that the end of the rod projects over the pocket, means for severing the solder rod to form a slug, a punch for forcing the slug into the pocket in the key for mechanically joining the solder slug to the key, and adjustable means for feeding the solder rod so that the size of the solder slug formed may be varied.

10. A machine for attaching solder to keys comprising a support, a turret mounted for intermittent rotation adjacent the support and having means for carrying keys having solder receiving pockets with the ends thereof projecting from the turret so that they may be placed over said support, a guide block for guiding a solder rod over the pocket in the key, means for clamping the key against the support beneath the solder rod so that the end of the rod projects over the pocket, means for severing the solder rod to form a slug, a punch for forcing the slug into the pocket in the key for mechanically joining the solder slug to the key, feed rolls for feeding the solder rod, a feed pawl for turning said feed rolls, an oscillating arm associated with said feed pawl, means for positively moving the arm for imparting a feeding movement to the pawl, and an adjustable stop for limiting the return movement of the feed pawl.

11. A machine for attaching solder to keys comprising an intermittently rotating turret having means for supporting the keys having solder receiving pockets therein with the ends of the keys projecting from the turret, means associated with the turret for forming and placing a solder slug in the pocket in the key, a shearing device for removing the surplus solder including a support for the key end and a shearing blade beneath which the key passes, said shearing blade having a curved cutting edge for contacting with the surplus solder for severing the same close to the face of the key.

12. A machine for attaching solder to keys comprising a magazine in which a stack of keys is supported, an intermittently rotating turret having means for receiving the keys from the magazine and supporting said keys with the ends thereof projecting from the turret, a punching means for punching a hole through the key, a solder slug forming means for forming a slug and filling the hole through the key with the solder therein flush with the lower face of the key and the surplus solder overlying the upper face of the key, and means for severing the surplus solder close to the upper face of the key.

13. A machine for attaching solder to keys comprising a magazine in which a stack of keys is supported, an intermittently rotating turret having means for receiving the keys from the magazine and supporting said keys with the ends thereof projecting from the turret, a punching means for punching a hole through the key, a solder slug forming means for forming a slug and filling the hole through the key with the solder therein flush with the lower face of the key, and the surplus solder overlying the upper face of the key, and means for severing the surplus solder close to the upper face of the key, said solder slug forming means including devices for varying the size of the solder sulg.

ALEXANDER A. TROMBLY.